US006928939B1

(12) United States Patent
Johnson et al.

(10) Patent No.: US 6,928,939 B1
(45) Date of Patent: Aug. 16, 2005

(54) CROP CONVERSION PLUG

(75) Inventors: Chad M. Johnson, Arlington Heights, IL (US); Paul M. Paluch, Woodridge, IL (US); Michael G. Landmesser, Hillside, IL (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/917,787

(22) Filed: Aug. 13, 2004

(51) Int. Cl.[7] .............................. A01C 7/00; A01C 9/00
(52) U.S. Cl. ..................................................... 111/175
(58) Field of Search ...................... 111/170, 174–188; 221/211

(56) References Cited

U.S. PATENT DOCUMENTS

| 4,872,785 | A | 10/1989 | Schrage et al. ............. 406/155 |
| 5,074,228 | A | 12/1991 | Daws .......................... 111/175 |
| 5,265,547 | A | 11/1993 | Daws .......................... 111/175 |
| 6,182,699 | B1 | 2/2001 | Hawkes ....................... 137/875 |
| 6,298,797 | B1 | 10/2001 | Mayerle et al. ............. 111/175 |
| 6,581,530 | B1 | 6/2003 | Hall et al. ...................... 111/52 |
| 2001/0013309 | A1 | 8/2001 | Mayerle et al. ............. 111/174 |
| 2002/0043197 | A1* | 4/2002 | Schaffert .................... 111/120 |
| 2003/0110995 | A1 | 6/2003 | Hall et al. .................... 111/52 |
| 2004/0025766 | A1 | 2/2004 | Ostrander et al. .......... 111/174 |
| 2004/0079264 | A1 | 4/2004 | Mayerle et al. ............. 111/174 |

* cited by examiner

Primary Examiner—Christopher J. Novosad
(74) Attorney, Agent, or Firm—Rebecca Henkel; Brant T. Maurer

(57) ABSTRACT

A bulk fill system for split row planters that can be easily converted to plant 30" corn or 15" soybeans with the aid of a conversion plug that controls the flow of seed entrenched air to select meters on planter rows. The conversion plug is easily installed and conveniently stored on the individual row units by a holder.

14 Claims, 4 Drawing Sheets

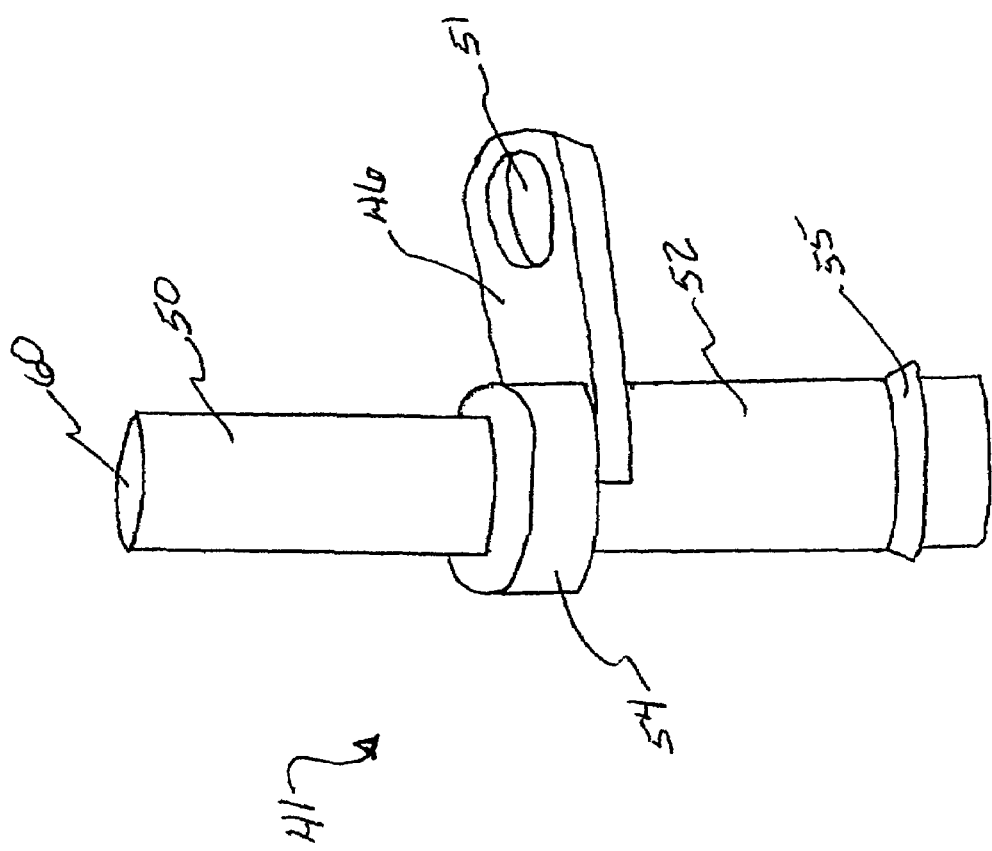

US 6,928,939 B1

CROP CONVERSION PLUG

BACKGROUND OF THE INVENTION

The present invention relates generally to agricultural seed planters, and more particularly to a crop conversion plug that increases the efficiency of solid row crop planters.

As the size of agricultural implements continues to grow, the versatility of such implements becomes more significant. Large air seeders have become increasingly popular for the planting of seeds, fertilizer, and other product. In order to increase farmers' asset utilization and reduce their capital requirements, many agricultural equipment manufacturers have introduced split row or otherwise called solid row crop planters. The premise behind a split row planter is to allow a farmer to plant multiple row crops at different row widths. Particularly in the Midwest, corn is primarily planted at 30" row spacing while soybeans are planted at 15" row spacing. Having the ability to plant both crops with one machine is extremely desirable.

Split row planters comprised of a bulk fill seed system distribute seed from a bulk storage tank through a conduit to isolated seed metering devices located on each individual row unit. A fan blows air through a distributor where it induces seed from the bulk storage tank to flow into the conduit eventually supplying the individual planter metering units with seed. The conduit carrying the seed entrenched air is split between two planter rows by a "Y" shaped connector that feeds a single 30" corn row and a single 15" soybean row.

It would be of significant advantage to develop a simple, yet reliable modification to such planting systems for controlling the flow of seeds to selected row units.

SUMMARY OF THE INVENTION

Accordingly, it is an important object of the present invention is to provide an improved split row planting system.

Another object of the present invention is to provide an improved mechanism for selectively controlling the flow of seed to individual row units of a split row planter.

It is another object of the instant invention to provide a conversion plug for a bulk fill system of a split row planter that can be used to easily convert the planting system between multiple row spacings.

It is another object of the instant invention to provide a conversion plug for a bulk fill system for a split row planter that can be used to easily convert the planting system between 30" corn or 15" soybeans.

It is a further object of the instant invention to provide a conversion plug that is easily installed and conveniently stored on the individual planter row units.

It is another object of this invention to provide a conversion plug for a split row planter that is durable in construction, inexpensive to manufacture, carefree of maintenance, facile in assemblage, and simple, versatile and effective in use.

These and other objects are attained by providing a bulk fill system for split row planters that can be easily converted to plant 30" corn or 15" soybeans with the aid of a conversion plug that controls the flow of seed entrenched air to select meters on planter rows. The plug is easily installed and conveniently stored on the individual row units by a holder.

DESCRIPTION OF THE DRAWINGS

The advantages of this invention will be apparent upon consideration of the following detailed disclosure of the invention, especially when taken in conjunction with the accompanying drawings wherein:

FIG. 7 is a perspective view showing the conversion plug and the holder.

DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
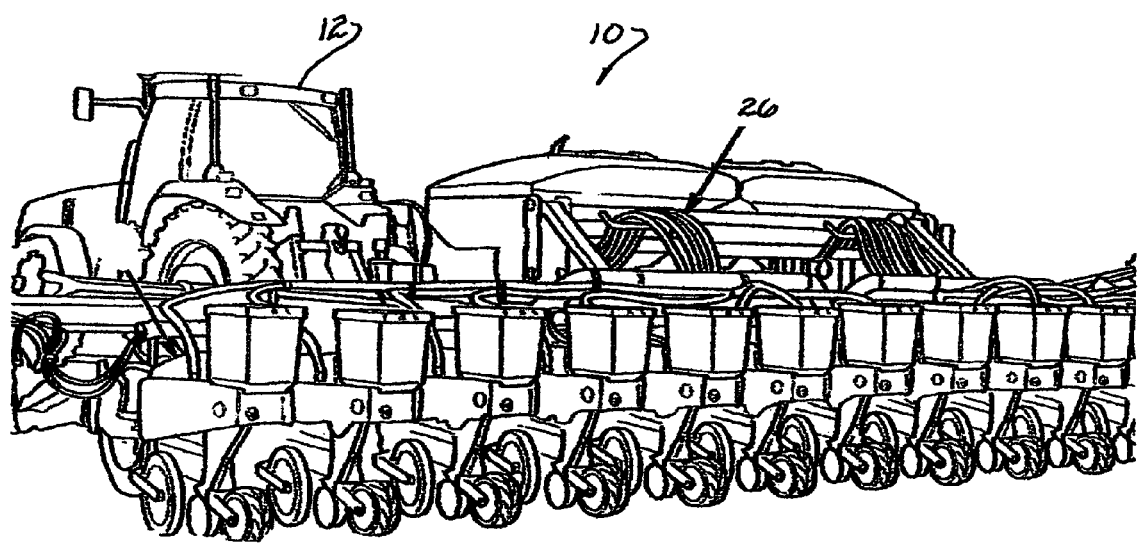
FIG. 1 is a rear perspective view of a bulk fill delivery system and its connection to the conduit network of a split row planter.
Figure 2:
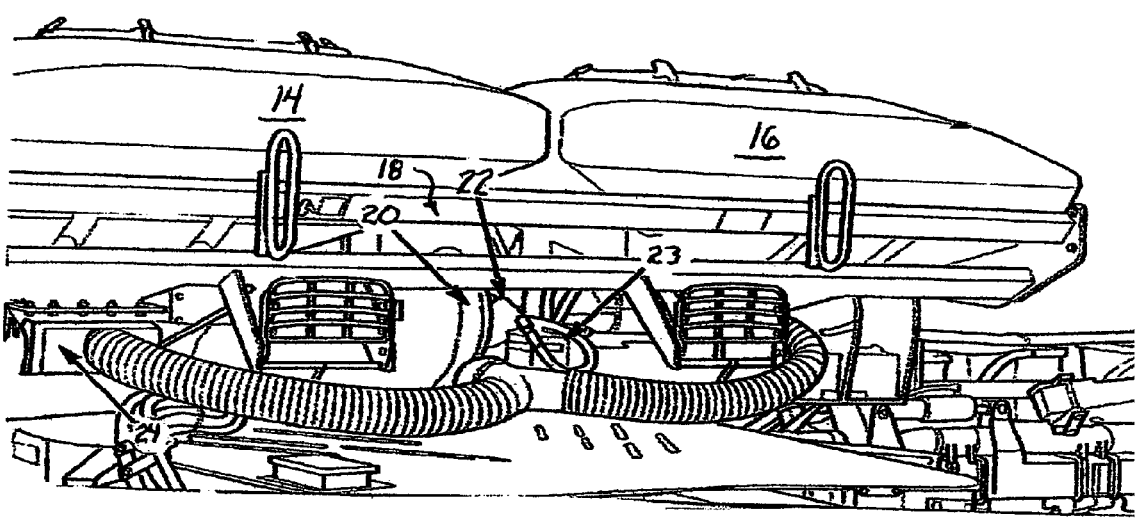
FIG. 2 is a front perspective view of the split row planter of FIG. 1, showing details of certain components thereof.

Referring initially to FIGS. 1 and 2, a general representation of a split row system 10 can be seen as it would be pulled through the field by a tractor 12. Bulk storage tanks 14 and 16, fan system 18 (fan 20, fan motor 22, and bulk fan valve 23), distributor 24 comprise the primary components of the bulk fill seed delivery system that mixes the seed in the airflow. FIG. 1 illustrates the connection of the bulk fill delivery system and the conduit network 26.

Figure 3:
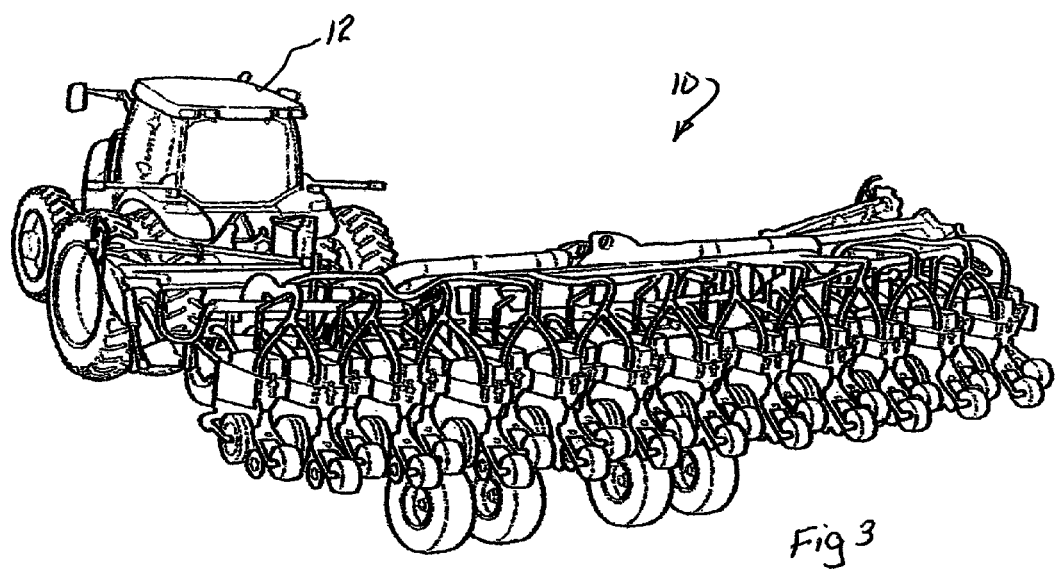
FIG. 3 is a partial rear perspective view of the conduit network for a split row planter.
Figure 4:
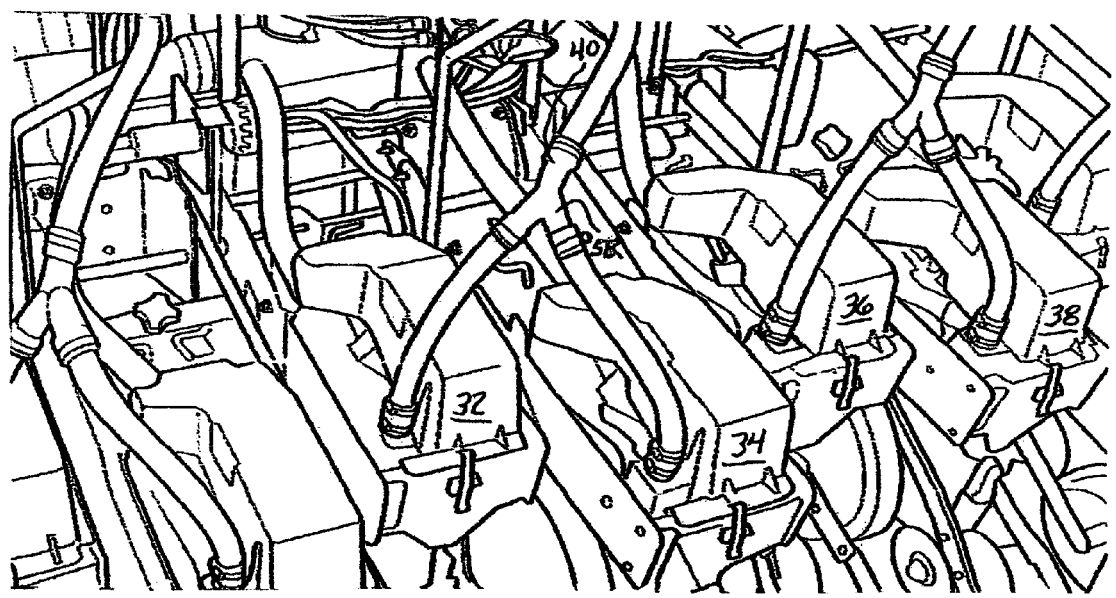
FIG. 4 is a partial perspective of the conduit network shown in FIG. 3.

FIG. 3, similar to FIG. 1, but with fewer components, depicts more detail to the conduit network for the split row planter. FIG. 4 shows a closer view of the conduit system, as it connects to the individual row planting units 32, 34, 36, and 38. While only four adjacent row units will be discuss for explanation purposes, it should be understood that the planter 10 is comprised of many more such units. Adjacent units are on 15" centers, setting the distance between every other unit at 30". Thus, if seeds are fed to all units, the rows will be on 15" centers, as most commonly used for soybeans, and if seeds are fed only to every other unit, the rows will be on 30" centers, as most commonly used for corn. In order to facilitate the selection between 15" and 30" rows, the seeds are fed through a "Y" connector 40 that evenly feeds adjacent row units 32, 34. By selectively closing one of the legs of the "Y" connector, such as leg 58, the rows will be at 30" centers, however, if both legs are left open, rows on 15" centers will be created. While the row spacings described immediately above are quite satisfactory under today's accepted practices for corn and soybeans, it is contemplated that other row spacings will also prove appropriate for these and other crops.

Conversion plug 41 is a generally elongate member, as best seen in FIG. 7, with first and second generally opposing cylindrical tube-like elements 50, 52 intersecting generally medially of the length thereof at a collar 54. Collar 54 has a diameter larger than that of either cylindrical element to provide a convenient surface to hold and manipulate the plug, and to gauge the insertion of the plug into the metering hose 56 and leg 58 of connector 40. Cylindrical element 50 is closed at end 60 and is of such diameter as to conveniently fit into leg 58 of "Y" connector 40 and close it off—preventing flow of air and seed into hose 56. The length of element 50 is such that it locates closed end closely adjacent to the intersection of "Y" connector 40 when collar 54 is pushed against collar 62 on leg 58.

When conversion plug 41 is inserted into leg 58 of the "Y" connector, the hose 56 may, for convenience and to prevent damage to the hose, be pushed onto cylindrical element 52. The outside diameter of element 52 is slightly less than the inside diameter of hose 56, and the outside peripheral surface may be coated with a friction material or coating, to permit a slight friction fit that can be conveniently accomplished by hand. In the alternative, the outside diameter may be somewhat larger, causing a slight interference fit with hose 56. In that case, the hose can be forced to expand to a friction fit. In either case, a hose clamp may be used above a smaller collar, such as 55, to additionally secure the connection.

Figure 5:
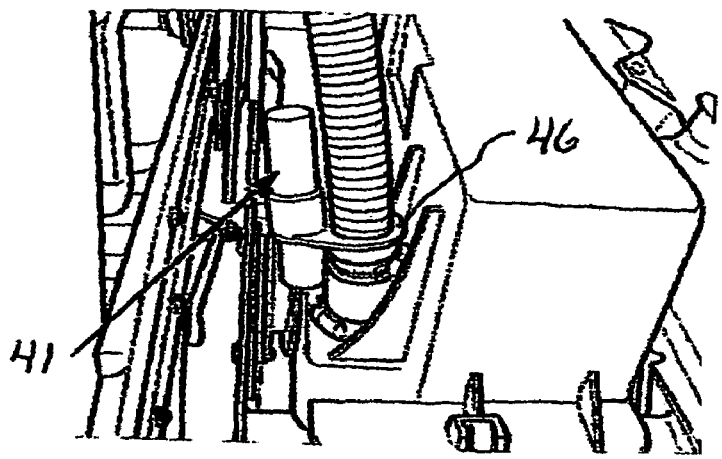
FIG. 5 is a perspective view showing the conversion plug in its storage position.
Figure 6:
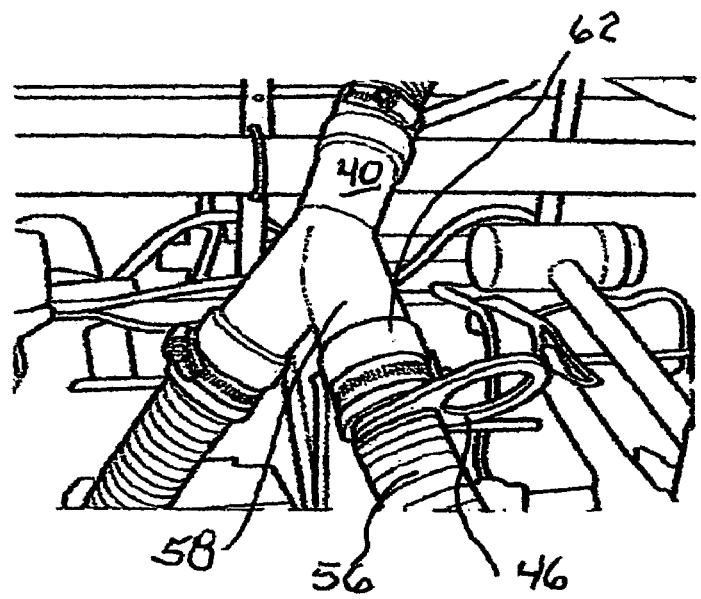
FIG. 6 is a perspective view showing the conversion plug installed into the "Y" connector.

As best seen in FIGS. 5–7, a holder 46 for conversion plug 41 is preferably formed integrally with plug 41 and is comprised of a generally planar flexible material, such as polyurethane. Holder 46 extends outwardly generally below collar 54 with one opening 51 therein. Opening 51 is of such a size as to fit snugly on hose 56, but not so snug that it cannot be moved longitudinally along hose 56 and removed therefrom. It is anticipated that the holder will be of sufficient flexibility to allow it to be easily located or relocated substantially anywhere along the length of hose 56, or any other similarly sized hose on the machine. This holder provides a handy mechanism for storing the conversion plug when not in use. In the alternative, holder 46 may be formed separately from plug 41, in which case it would have two openings therethrough, one for a hose and one for either the first or second elements 50, 52.

Conversion plug 41 may be solid or hollow, (preferably hollow and open at the outer end of first leg 50). The important dimension is, as discussed above, the length of element 50–the intent being to limit as reasonably possible the creation of a pocket at the intersection of the "Y" connector in which an undue volume of seeds can build up. In the preferred embodiment, the conversion plug 41 is generally symmetrical (except for the integral holder 46) about its longitudinal axis. This design eliminates any question about how to properly insert the conversion plug.

To install the conversion plug 41, the operator would loosen the hose clamp at the "Y" connector joining the seed metering hose from the 15" soybean row to the connector. With the clamp loose, the seed metering hose 56 is removed from the connector, one element 50 of the conversion plug is inserted into the "Y" connector and the other element into the seed metering hose. The clamp is then retightened. To remove the conversion plug, the steps outlined are reversed.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. In an agricultural split row planter having a bulk fill seed system to distribute seed from a bulk storage tank through a plurality of conduits to isolated seed metering devices, the improvement comprising:
   said isolated seed metering devices include a plurality of row planting units mounted on generally side-by-side generally equal centers;
   adjacent pairs of said row planting units being in flow communication with one of said plurality of conduits through a "Y" connector, said "Y" connector having one input leg and two output legs, each of the two output legs of said connector in flow communication, via a metering hose, with one of the row planting units making up an adjacent pair;
   a conversion plug sized to snugly fit within one of said output legs upon removal of said respective metering hose, said conversion plug closed to flow communication therethrough; and
   a planar holder for said conversion plug, said holder affixed to said conversion plug and having a first opening therethrough, one of said metering hoses removably extending through said first opening, whereby said conversion plug is readily available for use.

2. The improvement of claim 1, wherein:
   said conversion plug is a generally elongate cylindrical member with first and second opposing elements on a longitudinal axis, each said element having an outer end;
   a collar located generally centrally along said longitudinal axis;
   said collar having a diameter greater than that of the remainder of the cylindrical member; and
   said conversion plug is generally hollow and closed adjacent said outer end of said first element.

3. The improvement of claim 2, wherein:
   the cylindrical portion of said conversion plug is of a diameter that friction fits into said metering hose.

4. The improvement of claim 3, wherein:
   said generally equal centers are approximately 15".

5. The improvement of claim 4, wherein:
   said planar holder is integral with said conversion plug.

6. The improvement of claim 4, wherein:
   said planar holder is formed with a second opening therethrough sized to friction fit one of said first or second elements.

7. In an agricultural split row planter having a bulk fill seed system to distribute seed from a bulk storage tank through a plurality of conduits to isolated seed metering devices, the improvement comprising:
   said isolated seed metering devices include a plurality of row planting units mounted generally side-by-side on approximately 15" centers;
   adjacent pairs of said row planting units being in flow communication with one of said plurality of conduits through a "Y" connector, said "Y" connector having one input leg and two output legs, each of the two output legs of said connector adapted for flow communication, via a metering hose, with one of the row planting units making up an adjacent pair; and a removable conversion plug fitted within one of said output legs upon removal of said respective metering hose, said conversion plug closed to flow communication therethrough, whereby one of the row planting units making up an adjacent pair is rendered inoperative and the distance between operable row planting units is approximately 30".

8. The improvement of claim 7, wherein:

said conversion plug is a generally elongate cylindrical member with first and second opposing elements on a longitudinal axis, each said element having an outer end;

a collar located generally centrally along said longitudinal axis;

said collar having a diameter greater than that of the remainder of the cylindrical member;

said outer end of said first element is closed.

9. The improvement of claim 8, wherein:

said outer end of said second element is also closed.

10. The improvement of claim 9, wherein:

the cylindrical portion of said conversion plug is of a diameter that friction fits into said metering hose.

11. A method of controlling the row width of an agricultural planter comprising the steps of:

providing an agricultural split row planter having a bulk fill seed system to distribute seed from a bulk storage tank through a plurality of conduits to isolated seed metering devices, said isolated seed metering devices include a plurality of row planting units mounted generally side-by-side on approximately 15" centers, adjacent pairs of said row planting units being in flow communication with one of said plurality of conduits through a "Y" connector, said "Y" connector having one input leg and two output legs, each of the two output legs of said connector in flow communication, via a metering hose, with one of the row planting units making up an adjacent pair;

providing a conversion plug sized to snugly fit within one of said output legs upon removal of the said respective metering hose, said conversion plug closed to flow communication therethrough;

providing a planar holder for said conversion plug, said holder affixed to said conversion plug and having a first opening therethrough, one of said metering hoses removably extending through said first opening, whereby said conversion plug is readily available for use;

removing one of said metering hoses from said respective output leg of said "Y" connector;

inserting a portion of said conversion plug into said respective output leg of said "Y" connector.

12. The method of claim 11, wherein:

said conversion plug is a generally elongate cylindrical member with first and second opposing elements and a longitudinal axis, each element with an outer end;

a collar located generally centrally along said longitudinal axis;

said collar having a diameter greater than that of the remainder of the cylindrical member; and said conversion plug is closed adjacent said outer end of said first element.

13. The method of claim 12, wherein:

said conversion plug is also closed adjacent said outer end of said second element.

14. The method of claim 13, wherein:

the cylindrical portion of said conversion plug is of a diameter that friction fits into said metering hose.

\* \* \* \* \*